(12) United States Patent
Hollis et al.

(10) Patent No.: US 6,580,430 B1
(45) Date of Patent: Jun. 17, 2003

(54) METHOD AND APPARATUS FOR PROVIDING IMPROVED FOG EFFECTS IN A GRAPHICS SYSTEM

(75) Inventors: Martin Hollis, Cambridge (GB); Patrick Y. Law, Milpitas, CA (US)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 09/726,225

(22) Filed: Nov. 28, 2000

Related U.S. Application Data

(60) Provisional application No. 60/227,032, filed on Aug. 23, 2000.

(51) Int. Cl.⁷ .............................................. G06T 15/70
(52) U.S. Cl. ........................ 345/473; 345/419; 345/426
(58) Field of Search ................................ 345/419, 420, 345/426, 473

(56) References Cited

U.S. PATENT DOCUMENTS

| | | | |
|---|---|---|---|
| 4,388,620 A | 6/1983 | Sherman |
| 4,425,559 A | 1/1984 | Sherman |
| 4,463,380 A | 7/1984 | Hooks, Jr. |
| 4,570,233 A | 2/1986 | Yan et al. |
| 4,658,247 A | 4/1987 | Gharachorloo |

(List continued on next page.)

FOREIGN PATENT DOCUMENTS

| | | |
|---|---|---|
| CA | 2070934 | 12/1993 |
| EP | 1 074 945 | 2/2001 |
| EP | 1 075 146 | 2/2001 |
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |
| JP | 2000-156875 | 6/2000 |
| JP | 2000-182077 | 6/2000 |
| JP | 2000-207582 | 7/2000 |
| JP | 2000-215325 | 8/2000 |
| WO | WO 94/10641 | 5/1994 |

OTHER PUBLICATIONS

Photograph of Sony PlayStation II System.
Photograph of Sega Dreamcast System.
Photograph of Nintendo 64 System.
Whitepaper: 3D Graphics Demystified, Nov. 11, 1999, www.nvidia.com.

(List continued on next page.)

*Primary Examiner*—Mark Zimmerman
*Assistant Examiner*—Enrique L Santiago
(74) *Attorney, Agent, or Firm*—Nixon & Vanderbye P.C.

(57) ABSTRACT

A graphics system including a custom graphics and audio processor produces exciting 2D and 3D graphics and surround sound. The system includes a graphics and audio processor including a 3D graphics pipeline and an audio digital signal processor. Improved fog simulation is provided by enabling backwards exponential and backwards exponential squared fog density functions to be used in the fog calculation. Improved exponential and exponential squared fog density functions are also provided which provide the ability to program a fog start value. A range adjustment function is used to adjust fog based on the X position of the pixels being rendered, thereby preventing range error as the line of sight moves away from the Z axis. An exemplary Fog Calculation Unit, as well as exemplary fog control functions and fog related registers, are also disclosed.

20 Claims, 11 Drawing Sheets

Fog calculation unit

U.S. PATENT DOCUMENTS

| Patent Number | Date | Inventor(s) | Ref |
|---|---|---|---|
| 4,725,831 A | 2/1988 | Coleman | |
| 4,829,295 A | 5/1989 | Hiroyuki | |
| 4,862,392 A | 8/1989 | Steiner | |
| 4,866,637 A | 9/1989 | Gonzalez-Lopez et al. | |
| 4,901,064 A | 2/1990 | Deering | |
| 4,914,729 A | 4/1990 | Omori et al. | |
| 4,945,500 A | 7/1990 | Deering | |
| 5,136,664 A | 8/1992 | Bersack et al. | |
| 5,170,468 A | 12/1992 | Shah et al. | |
| 5,268,996 A | 12/1993 | Steiner et al. | |
| 5,357,579 A | 10/1994 | Buchner et al. | |
| 5,363,475 A | 11/1994 | Baker et al. | |
| 5,392,385 A | 2/1995 | Evangelisti et al. | |
| 5,392,393 A | 2/1995 | Deering | |
| 5,412,796 A | 5/1995 | Olive | |
| 5,415,549 A | 5/1995 | Logg | |
| 5,421,028 A | 5/1995 | Swanson | |
| 5,432,895 A | 7/1995 | Myers | |
| 5,457,775 A | 10/1995 | Johnson, Jr. et al. | |
| 5,504,917 A | 4/1996 | Austin | |
| 5,535,374 A | 7/1996 | Olive | |
| 5,573,402 A | 11/1996 | Gray | |
| 5,594,854 A | 1/1997 | Baldwin et al. | |
| 5,608,424 A | 3/1997 | Takahashi et al. | |
| 5,616,031 A | 4/1997 | Logg | |
| 5,687,357 A | 11/1997 | Priem | |
| 5,701,444 A | 12/1997 | Baldwin | |
| 5,721,947 A | 2/1998 | Priem et al. | |
| 5,724,561 A | 3/1998 | Tarolli et al. | |
| 5,727,192 A | 3/1998 | Baldwin | |
| 5,758,182 A | 5/1998 | Rosenthal et al. | |
| 5,764,243 A | 6/1998 | Baldwin | |
| 5,768,626 A | 6/1998 | Munson et al. | |
| 5,768,629 A | 6/1998 | Wise et al. | |
| 5,774,133 A | 6/1998 | Neave et al. | |
| 5,777,629 A | 7/1998 | Baldwin | |
| 5,798,770 A | 8/1998 | Baldwin | |
| 5,801,706 A | 9/1998 | Fujita et al. | |
| 5,801,716 A | 9/1998 | Silverbrook | |
| 5,805,868 A | 9/1998 | Murphy | |
| 5,815,166 A | 9/1998 | Baldwin | |
| 5,821,949 A | 10/1998 | Deering | |
| 5,874,969 A | 2/1999 | Storm et al. | |
| 5,917,496 A | 6/1999 | Fujita et al. | |
| 5,920,326 A | 7/1999 | Rentschler et al. | |
| 5,940,086 A | 8/1999 | Rentschler et al. | |
| 5,949,424 A | 9/1999 | Cabral et al. | |
| 5,949,440 A | 9/1999 | Krech, Jr. et al. | |
| 5,969,726 A | 10/1999 | Rentschler et al. | |
| 5,977,984 A | 11/1999 | Omori | |
| 5,990,903 A | 11/1999 | Donovan | |
| 5,999,196 A | 12/1999 | Storm et al. | |
| 6,002,409 A | 12/1999 | Harkin | |
| 6,005,582 A | 12/1999 | Gabriel et al. | |
| 6,023,738 A | 2/2000 | Priem et al. | |
| 6,025,853 A | 2/2000 | Baldwin | |
| 6,028,611 A | 2/2000 | Anderson et al. | |
| 6,037,949 A | 3/2000 | DeRose et al. | |
| 6,057,852 A | 5/2000 | Krech, Jr. | |
| 6,064,392 A | 5/2000 | Rohner | |
| 6,092,124 A | 7/2000 | Priem et al. | |
| 6,173,367 B1 | 1/2001 | Aleksic et al. | |
| 6,181,352 B1 | 1/2001 | Kirk et al. | |
| 6,198,488 B1 | 3/2001 | Lindholm et al. | |
| 6,226,012 B1 | 5/2001 | Priem et al. | |
| 6,268,861 B1 * | 7/2001 | Sanz-Pastor et al. | 345/426 |
| 6,342,892 B1 * | 1/2002 | Van Hook et al. | 345/503 |
| 6,437,781 B1 * | 8/2002 | Tucker et al. | 345/426 |

OTHER PUBLICATIONS

Whitepaper: "Z Buffering, Interpolation and More W–Buffering", Doug Rogers, Jan. 31, 2000, www.nvidia.com.

Whitepaper: Using GL_NV_vertex_array and GL_NV_fence, posted Aug. 1, 2000, www.nvidia.com.

Whitepaper: Anisotropic Texture Filtering in OpenGL, posted Jul. 17, 2000, www.nvidia.com.

Whitepaper: Mapping Texels to Pixels in D3D, posted Apr. 5, 2000, www.nvidia.com.

Whitepaper: Guard Band Clipping, posted Jan. 31, 2000, www.nvidia.com.

Whitepaper: Cube Environment Mapping, posted Jan. 14, 2000, www.nvidia.com.

Whitepaper: Color Key in D3D, posted Jan. 11, 2000, www.nvidia.com.

Whitepaper: Vertex Blending Under DX7 for the GeForce 256, Jan. 5, 2000, www.nvidia.com.

Whitepaper: Optimizing Direct3D for the GeForce 256, Jan. 3, 2000, www.nvidia.com.

Whitepaper: Dot Product Texture Blending, Dec. 3, 1999, www.nvidia.com.

Whitepaper: Technical Brief: AGP 4X with Fast Writes, Nov. 10, 1999, www.nvidia.com.

Technical Brief: Transform and Lighting, Nov. 10, 1999, www.nvidia.com.

Technical Brief: What's New With Microsoft DirectX7, posted Nov. 10, 1999, www.nvidia.com.

Mitchell et al., "Multitexturing in DirectX6", Game Developer, Sep. 1998, www.gdmag.com.

VisionTek, "GeForce2 GS Graphics Processing Unit", ©2000 www.visiontek.com.

Jim Bushnell et al. "Advanced Multitexture Effects With Direct3D and OpenGL", Pyramid Peak Design & ATI Research, Inc., GameDevelopers Conferencem ©1999.

Sony PlayStation II Instruction Manual, Sony Computer Entertainment Inc., ©2000.

Stand and Be Judged, Next Generation, May 2000.

PlayStation II: Hardware Heaven or Hell?, Next Generation, Jan. 2000.

Chris Charla, "Play Station II: The Latest News", Next Generation, Sep. 1999.

"First PlayStation II Gameplay Screens Revealed!", Next Generation, Sep. 1999.

Game Enthusiast Online Highlights, Mar. 18, 1999.

Game Enthusiast Online Highlights, Mar. 19, 1999.

Game Enthusiast Online Highlights, Mar. 17, 1999.

Game Enthusiast Online Highlights, Oct. 20, 1999.

Joel Easley, "PlayStation II Revealed", Game Week, Sep. 29, 1999.

Inside Sony's Next Generation Playstation, ©1999.

Press Release, Mar. 18, 1999.

Chris Johnston, "PlayStation Part Deux", Press Start, ©1999.

Nikkei Shimbun, "Sony Making SME, Chemical and SPT into Wholly–Owned Subsidiaries", Mar. 9, 1999.

AM News: Japanese Developers Not All Sold on PS2, Next Generation, Mar. 16, 1999.

Sony To Turn PlayStation Maker Into Wholly Owned Unit– Nikkei, Dow Jones News Service, Mar. 8, 1999.

Yumiko Ono, Sony Antes Up Its Chips In Bet On New Game System, Dow Jones News Service, Mar. 4, 1999.

MacWeek.Com Gets Inside Story on Connectix VGS for Windows; Controversial Emulator of Sony PlayStation Games Cureently Available for Macs Only, Business Wire, Mar. 12, 1999.

"DexDrive Bridges Gap", The Tampa Tribune, Mar. 12, 1999.

A Microprocessor With a 128b CPU, 10 Floating–Point MAC's, 4 Floating–Point Dividers, and an MPEG2 Decoder, 1999 IEEE International Solid–State Circuits Conference, Feb. 16, 1999.

Dreamcast Instruction Manual, Sega Enterprises, Ltd., ©1998.

"Sega To Launch Video Camera for Dreamcast", Reuters Business News, Feb. 16, 2000.

David Pescovitz, "Dream On", Wired, Aug. 1999.

Randy Nelson, "Dreamcast 101: Everything You Ever Wanted To Know About Sega's Powerful New Console", Official Sega Dreamcast Magazine, Jun. 1999.

2D/3D Graphics Card User Manual, Guillemot ©1999.

Nintendo 64 Instruction Booklet, Nintendo of America, 1998.

Steven Levy, "Here Comes PlayStaytion II", Newsweek, Mar. 6, 2000.

David Sheff, "Sony Smackage: Test Driving The PlayStation II", Wired, Nov. 1999.

Introducing The Next Generation PlayStation, Sony Computer Entertainment Inc., ©1999.

Leadtek GTS, Aug. 3, 2000, www.hexus.net.

Voodoo 5 5500 Review, Jul. 26, 2000, www.hexus.net.

ATI Radeon 64 Meg DDR OEM, Aug, 19, 2000, www.hexus.net.

Microsoft Xbox—The Future of Gaming, Microsoft Xbox Performance Sheet, www.xbox.com.

Robert L. Cook, "Shade Trees", Computer Graphics, vol. 18, No. 3, Jul. 1984.

Wang et al., "Second–Depth Shadow Mapping", Department of Computer Science, Univ. N.C, Chapel Hill, N.C. pp. 1–7.

Peercy et al., "Efficient Bump Mapping Hardware", Computer Graphics Proceedings, Annual Conference Series, 1997.

Gustavo Oliveira, "Refractive Texture Mappig, Part One", www.gamasutra.com, Nov., 10, 2000.

John Schlag, Fast Embossing Effects on Raster Image Data, Graphics Gems IV, Edited by Paul S. Heckbert, Computer Science Department, Carnegie Mellon University, Academic Press, Inc., 1994,pp. 433–437.

James F. Blinn, "Simulationof Wrinkled Surfaces," Caltech/JPL, pp. 286–292, SIGGRAPH 78 (1978).

Tomas Möller and Eric Haines "Real–Time Rendering", AK Peters, Ltd., ©1999, pp. 127–142.

Technical Presentation: Vertex Buffers, posted Jun. 12, 2000, www.nvidia.com.

Technical Presentation: Hardware Transform and Lighting, www.nvidia.com, posted Jun. 12, 2000.

Technical Presentation: Hardware Bump–mapping Choices and Concepts, Jun. 7, 2000, www.nvidia.com.

Technical Presentation: How to Bump Map a Skinned Polygonal Model, Jun. 7, 2000, www.nvidia.com.

Technical Presentation: Computations for Hardware Lighting and Shading, Mar. 17, 2000, www.nvidia.com.

Technical Presentation: Practical Bump–mapping for Today's GPUs, Mar. 17, 2000, www.nvidia.com.

Technical Presentation: Shadows, Transparency, & Fog, Mar. 17, 2000 www.nvidia.com.

Technical Presentation: GeForce 256 Register Combiners, Mar. 17, 2000,www.nvidia.com.

Technical Presentation: TexGen & The Texture Matrix, Mar. 15, 2000 www.nvidia.com.

Technical Presentation: Toon Shading, Mar. 15, 2000, www.nvidia.com.

Technical Presnetation: D3D 7 Vertex Lighting, Mar. 15, 2000. www.nvidia.com.

Technical Presentation: Per–Pixel Lighting (by S. Dietrich) Mar. 14, 2000 www.nvidia.com.

Technical Presentation: GeForce 256 and RIVA TNT Combiners, Dec. 8, 1999, www.nvidia.com.

Technical Presentation: Vertex Cache Optimization, Nov. 12, 1999, www.nvidia.com.

Technical Presentation: Vertex Blending, Nov. 12, 1999, www.nvidia.com.

Technical Presentation: Hardware Transform and Lighting, Nov. 12, 1999, www.nvidia.com.

Technical Presentation: GeForce 256 Overview, Nov. 12, 1999, www.nvidia.com.

Technical Presentation: DirectX 7 and Texture Management, Nov. 12, 1999 www.nvidia.com.

Technical Presentation: Dot Product Lighting, Nov. 12, 1999, www.nvidia.com.

Technical Presentation: Texture Coordinate Generation, Nov. 3, 1999, www.nvidia.com.

Technical Presentation: Phong Shading and Lightmaps, Nov. 3, 1999, www.nvidia.com.

Technical Presentation: The ARB_multitexture Extension, Nov. 3, 1999, www.nvidia.com.

Technical Presentation: Multitexture Combiners, Nov. 3, 1999, www.nvidia.com.

Technical Presentation: Emboss Bump Mapping, Nov. 3, 1999, www.nvidia.com.

Technical Presentation: Hardware Accelerated Anisotropic Lighting, Nov. 3, 1999, www.nvidia.com.

Technical Presentation: Guard Band Clipping, Nov. 3, 1999, www.nvidia.com.

The RenderMan Interface, Stephan R. Keith, Version 3.1, Pixar Animation Studios, Sep. 1989.

The RenderMan Interface, Version 3.2, Pixar Animation Studios, Jul. 2000, www.pixar.com.

NVIDIA Product Overview, "GeForce2Ultra", NVIDIA Corporation, Aug. 21, 2000, www.nvidia.com.

Duke, "Dreamcast Technical Specs", Sega Dreamcast Review, Sega, 2/99, www.game–revolution.com Marlin Rowley, "GeForce 1& 2 GPU Speed Tests", May 11, 2000, www.g256.com.

"Dreamcast: The Full Story", Next Generation, Sep. 1998.

DirectX 7.0 Programmer's Reference, Microsoft Corporation, 1995–1999 (as part of the DirectX 7.0 SDK on the Conpanion CD included with "Inside Direct3D", Microsoft Programming Series, Peter J. Kovach, Microsoft Press, 1999).

"Inside Direct3D", Microsoft Programming Series, Peter J. Kovach, Microsoft Press, 1999.

"OpenGL Programming Guide, The Official Guide to Learning OpenGL, Release 1", Jackie Nieder, Tom David, Mason Woo, Addison–Wesley Publishing Co., 1993.

"Procedural Elements for Computer Graphics," Second Edition, David F. Rogers, McGraw Hill, 1998.

"Real–Time Rendering," Tomas Molleir, Eric Haines, AK Peters, 1999.

"Computer Graphics, Principles and Practices," Second Edition, The Systems Programming Series, Foley, van Dam, Fiener, Hughes, Addison Wesley, 1990.

"Principles of Three–Dimensional Computer Animation", Revised Edition, Michael O'Rourke, W.W. Norton & Company, 1998.

* cited by examiner

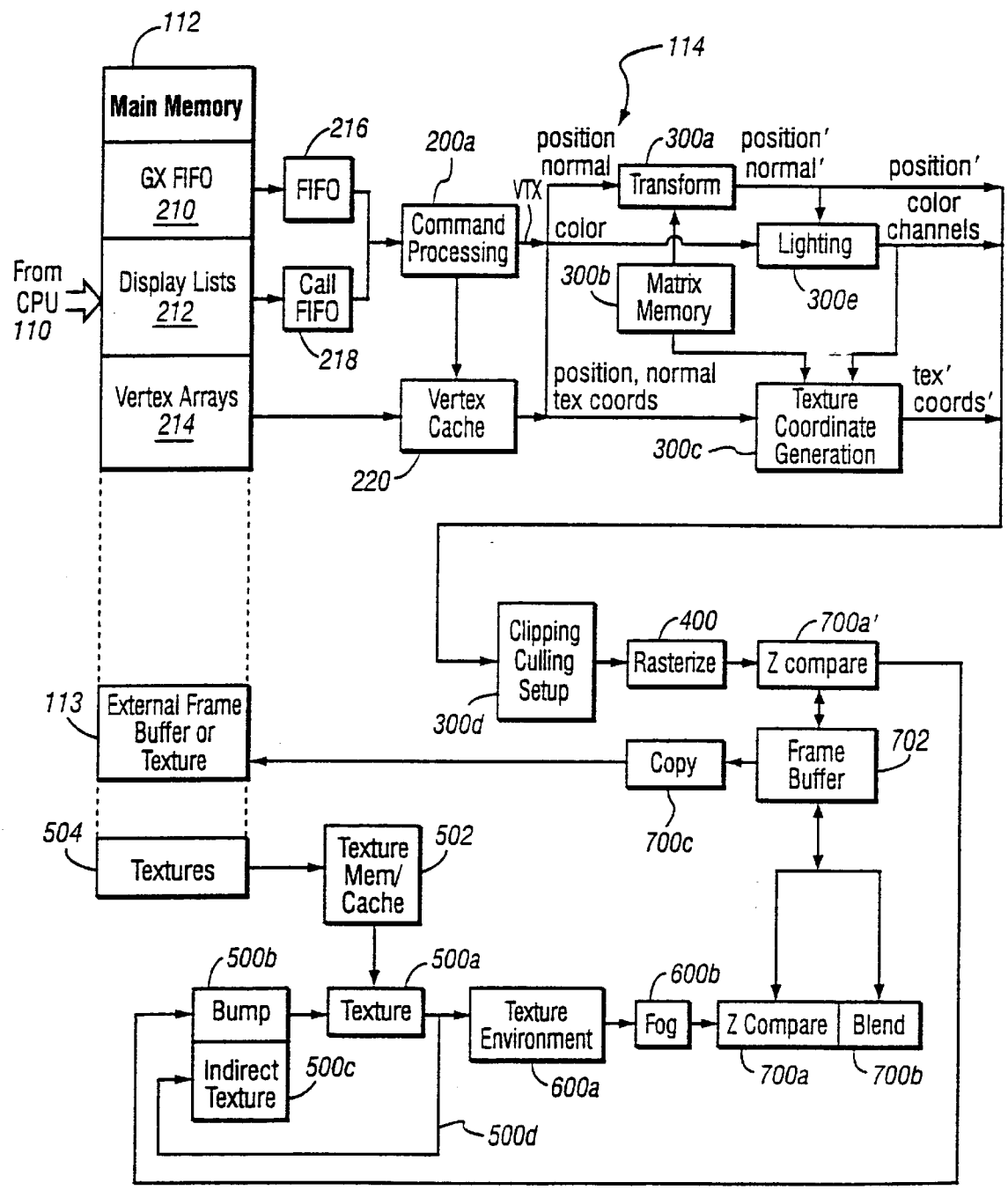
Fig. 5 EXAMPLE GRAPHICS PROCESSOR FLOW

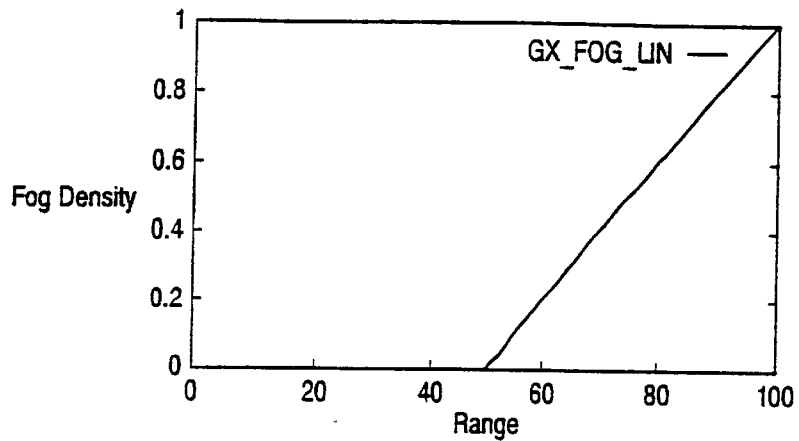
Fig. 6A Linear fog curve
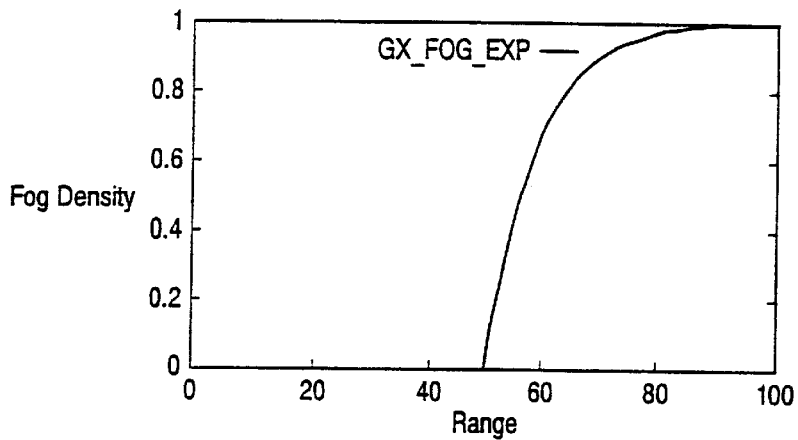
Fig. 6B Exponential fog curve
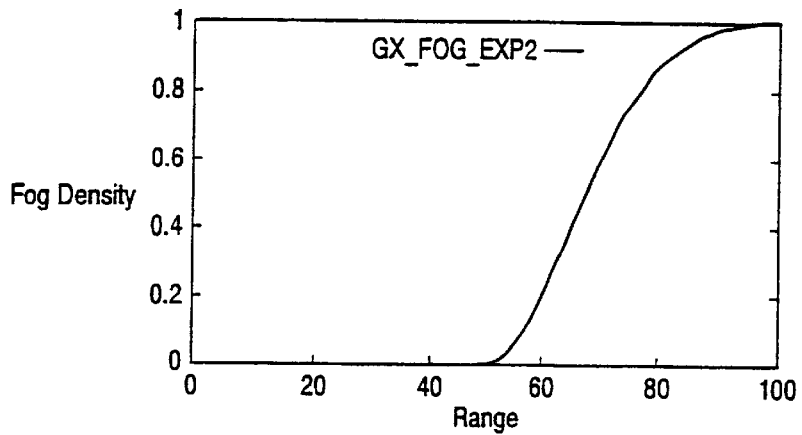
Fig. 6C Exponential squared fog curve

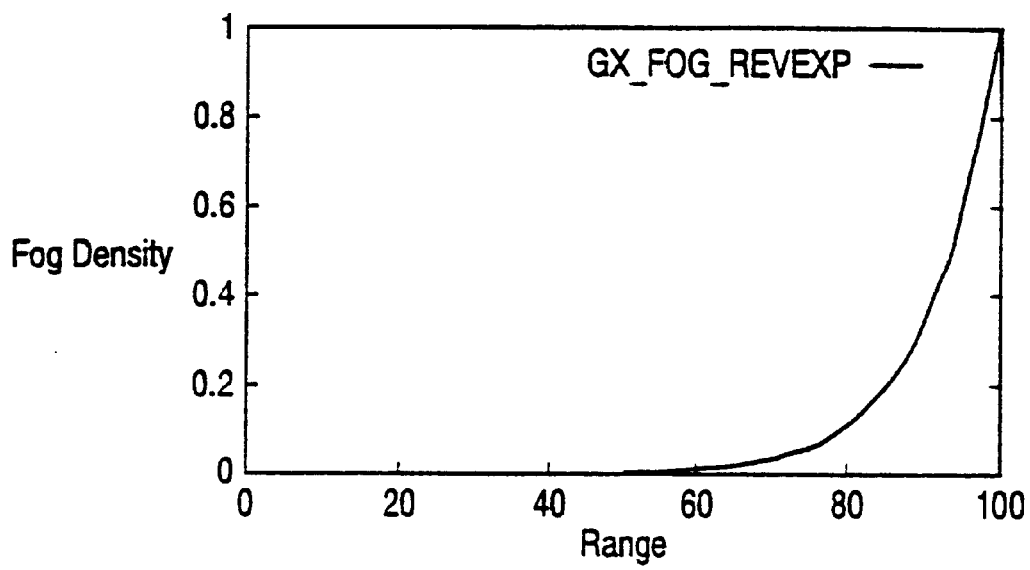
Fig. 6D Backward exponential fog curve
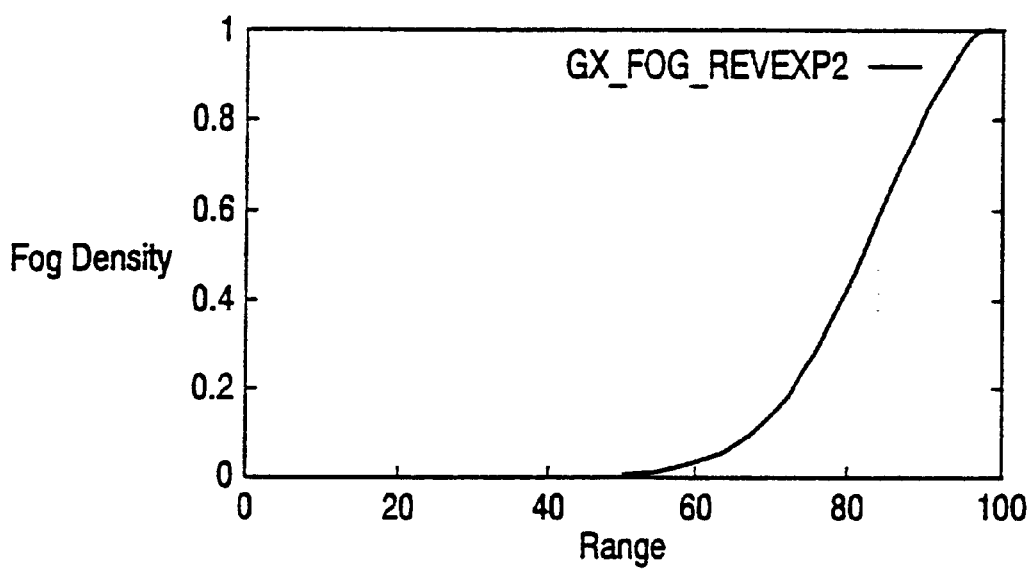
Fig. 6E Backward exponential squared fog curve

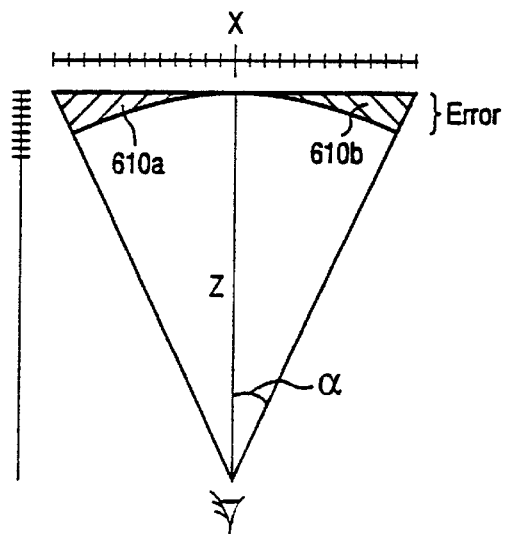
Fig. 7 Fog range adjustment
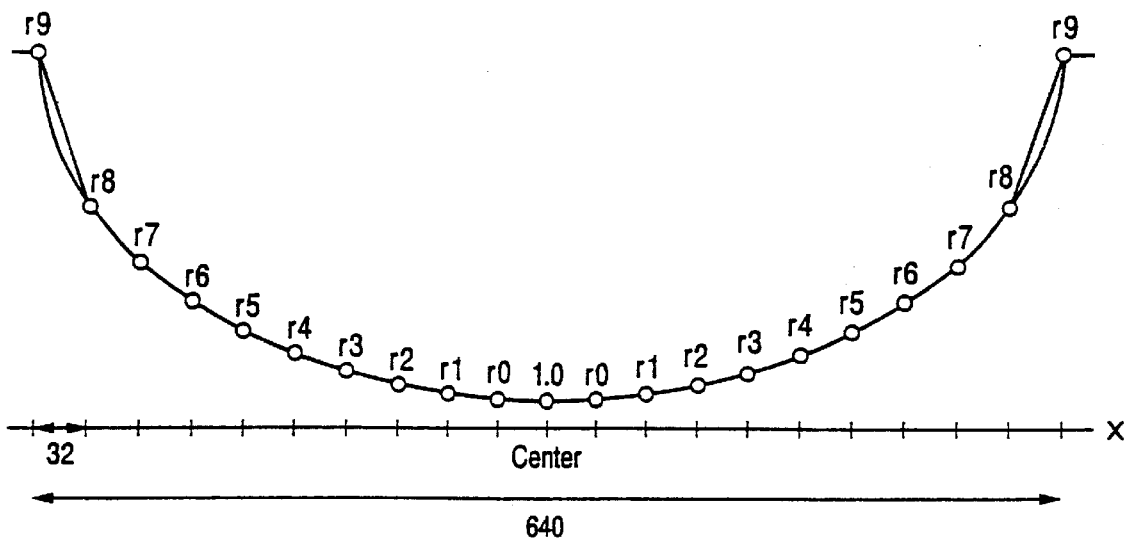
Fig. 8 Fog Compensation function

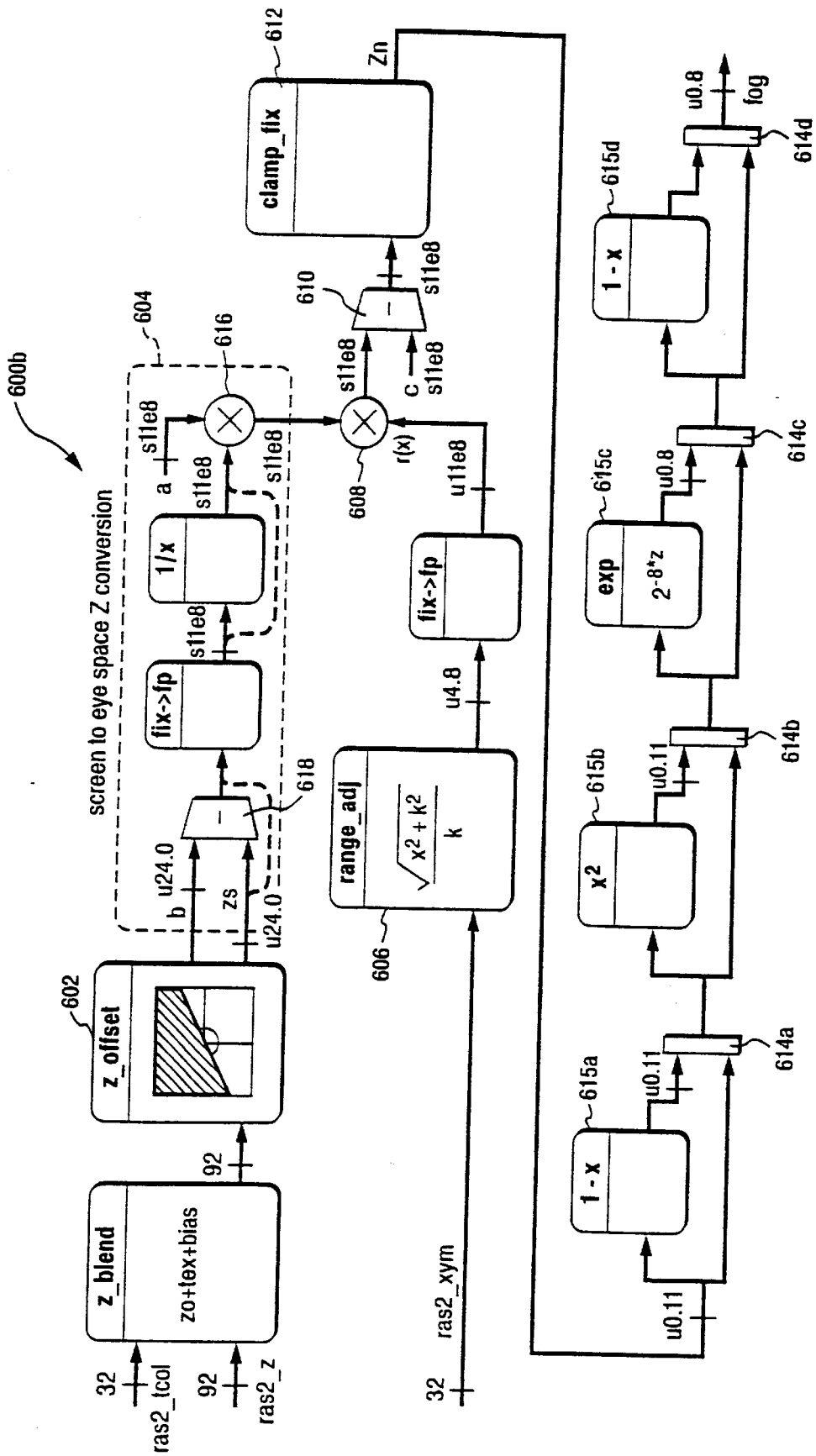
Fig. 9 Fog calculation unit

METHOD AND APPARATUS FOR PROVIDING IMPROVED FOG EFFECTS IN A GRAPHICS SYSTEM

CROSS-REFERENCE TO RELATED APPLICATIONS

This application is filed in accordance with 35 U.S.C. §119(e)(1) and claims the benefit of the provisional application Ser. No. 60/227,032 filed on Aug. 23, 2000, entitled "Method And Apparatus For Providing Improved Fog Effects In A Graphics System."

This application is related to the following applications identified below, which focus on various aspects of the graphics system described herein. Each of the following applications are hereby incorporated herein by reference.

- provisional Application No. 60/161,915, filed Oct. 28, 1999 and its corresponding utility application Ser. No. 09/465,754, filed Dec. 17, 1999, both entitled "Vertex Cache For 3D Computer Graphics",
- provisional Application No. 60/226,912, filed Aug. 23, 2000 and its corresponding utility application Ser. No. 09/726,215, filed Nov. 28, 2000, both entitled "Method and Apparatus for Buffering Graphics Data in a Graphics System",
- provisional Application No. 60/226,889, filed Aug. 23, 2000 and its corresponding utility application Ser. No. 09/722,419, filed Nov. 28, 2000, both entitled "Graphics Pipeline Token Synchronization",
- provisional Application No. 60/226,891, filed Aug. 23, 2000 and its corresponding utility application Ser. No. 09/722,382, filed Nov. 28, 2000, both entitled "Method And Apparatus For Direct and Indirect Texture Processing In A Graphics System",
- provisional Application No. 60/226,888, filed Aug. 23, 2000 and its corresponding utility application Ser. No. 09/722,367, filed Nov. 28, 2000, both entitled "Recirculating Shade Tree Blender For A Graphics System",
- provisional Application No. 60/226,892, filed Aug. 23, 2000 and its corresponding utility application Ser. No. 09/726,218, filed Nov. 28, 2000, both entitled "Method And Apparatus For Efficient Generation Of Texture Coordinate Displacements For Implementing Emboss-Style Bump Mapping In A Graphics Rendering System",
- provisional Application No. 60/226,893, filed Aug. 23, 2000 and its corresponding utility application Ser. No. 09/722,381, filed Nov. 28, 2000, both entitled "Method And Apparatus For Environment-Mapped Bump-Mapping In A Graphics System",
- provisional Application No. 60/227,007, filed Aug. 23, 2000 and its corresponding utility application Ser. No. 09/726,216, filed Nov. 28, 2000, both entitled "Achromatic Lighting in a Graphics System and Method",
- provisional Application No. 60/226,900, filed Aug. 23, 2000 and its corresponding utility application Ser. No. 09/726,226, filed Nov. 28, 2000, both entitled "Method And Apparatus For Anti-Aliasing In A Graphics System",
- provisional Application No. 60/226,910, filed Aug. 23, 2000 and its corresponding utility application Ser. No. 09/722,380, filed Nov. 28, 2000, both entitled "Graphics System With Embedded Frame Buffer Having Reconfigurable Pixel Formats",
- utility application Ser. No. 09/585,329, filed Jun. 2, 2000, entitled "Variable Bit Field Color Encoding",
- provisional Application No. 60/226,890, filed Aug. 23, 2000 and its corresponding utility application Ser. No. 09/726,227, filed Nov. 28, 2000, both entitled "Method And Apparatus For Dynamically Reconfiguring The Order Of Hidden Surface Processing Based On Rendering Mode",
- provisional Application No. 60/226,915, filed Aug. 23, 2000 and its corresponding utility application Ser. No. 09/726,210, filed Nov. 28, 2000, both entitled "Method And Apparatus For Providing Non-Photorealistic Cartoon Outlining Within A Graphics System",
- provisional Application No. 60/226,885, filed Aug. 23, 2000 and its corresponding utility application Ser. No. 09/722,664, filed Nov. 28, 2000, both entitled "Controller Interface For A Graphics System",
- provisional Application No. 60/227,033, filed Aug. 23, 2000 and its corresponding utility application Ser. No. 09/726,221, filed Nov. 28, 2000, both entitled "Method And Apparatus For Texture Tiling In A Graphics System",
- provisional Application No. 60/226,899, filed Aug. 23, 2000 and its corresponding utility application Ser. No. 09/722,667, filed Nov. 28, 2000, both entitled "Method And Apparatus For Pre-Caching Data In Audio Memory",
- provisional Application No. 60/226,913, filed Aug. 23, 2000 and its corresponding utility application Ser. No. 09/722,378, filed Nov. 28, 2000, both entitled "Z-Texturing",
- provisional Application No. 60/227,031, filed Aug. 23, 2000 entitled "Application Program Interface for a Graphics System",
- provisional Application No. 60/227,030, filed Aug. 23, 2000 and its corresponding utility application Ser. No. 09/722,663, filed Nov. 28, 2000, both entitled "Graphics System With Copy Out Conversions Between Embedded Frame Buffer And Main Memory",
- provisional Application No. 60/226,886, filed Aug. 23, 2000 and its corresponding utility application Ser. No. 09/722,665, filed Nov. 28, 2000, both entitled "Method and Apparatus for Accessing Shared Resources",
- provisional Application No. 60/226,884, filed Aug. 23, 2000 and its corresponding utility application Ser. No. 09/723,335, filed Nov. 28, 2000, both entitled "External Interfaces For A 3D Graphics and Audio Coprocessor",
- provisional Application No. 60/226,894, filed Aug. 23, 2000 and its corresponding utility application Ser. No. 09/726,220, filed Nov. 28, 2000, both entitled "Graphics Processing System With Enhanced Memory Controller",
- provisional Application No. 60/226,914, filed Aug. 23, 2000 and its corresponding utility application Ser. No. 09/722,390, filed Nov. 28, 2000, both entitled "Low Cost Graphics System With Stitching Hardware Support For Skeletal Animation", and
- provisional Application No. 60/227,006, filed Aug. 23, 2000 and its corresponding utility application Ser. No. 09/722,421, filed Nov. 28, 2000, both entitled "Shadow Mapping In A Low Cost Graphics System".

FIELD OF THE INVENTION

The present invention relates to computer graphics, and more particularly to interactive graphics systems such as home video game platforms. Still more particularly this invention relates to a system and method for providing improved fog effects in interactive three dimensional (3D) graphics systems.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was to improve realism of the graphic system by closer modeling of the 3D virtual world in the graphics system to the real world. One problem with graphics systems is that they do not automatically take into account the effect that fog and other similar atmospheric conditions create in the real world. In other words, computer graphics images having a distinctive crystal clear quality throughout the image can appear unrealistic as compared to the real world. In the real world, far away objects look less clear to the viewer than do close objects. This difference in clarity results from the fact that fog, smog, mist, smoke, pollution and/or haze (hereafter simply "fog") can exist in the atmosphere between the viewer and the object being viewed. As a result, the molecules making up the fog deflect light, thereby causing clarity of an object to be reduced as the distance from the viewer to the object increases. For example, in the real world, fog causes a tree that is close to a person to look clearer to that person than will a tree that is far away from that same person.

In contrast, in the virtual world of a computer graphics system, objects will all have the same clarity unless a mechanism is employed in the graphics system to simulate the effects of fog. Various solutions to this problem were offered. For example, many graphics systems have provided functions and techniques for incorporating atmospheric effects, such as fog, into a rendered scene in order to provide a more realistic view of the virtual world. For instance, the OpenGL graphics system, which provides a commonly used software interface to graphics hardware, enables a programmer to render atmospheric fog effects. OpenGL implements fogging by blending fog color with incoming fragments using a fog blending factor (f), as follows:

$$C = fC_{in} + (1-f)C_{fog}$$

This blending factor is computer using one of the following three equations:

Exponential (GL_EXP): $f = e^{-(density \cdot z)}$  (1)

Exponential-squared (GL_EXP2): $f = e^{-(density \cdot z)^{**2}}$  (2)

Linear (GL_LINEAR): $f = (end-z)/(end-start)$  (3)

where z is the eye-coordinate distance between the viewpoint and the fragment center. The values for density, start and end are all specified the programmer using a particular function (i.e. glfog*( )).

Linear fog is frequently used to, for example, implement intensity depth-cuing in which objects closer to the viewer are drawn at a higher intensity. The effect of intensity as a function of distance is achieved by blending the incoming fragments with a black fog color. The exponential fog equation has some physical basis; it is the result of integrating a uniform attenuation between the object and the viewer. The exponential function can be used to, for example, represent a number of atmospheric effects using different combinations of fog colors and fog density values. By using fog, the obscured visibility of objects near the far plane can be exploited to overcome various problems such as drawing time overruns, level-of-detail transition, and database paging. However, in practice it has been found that the exponential function does not attenuate distant fragments rapidly enough. Thus, the exponential-squared fog was introduced in OpenGlL to provide a sharper fall-off in visibility. The Direct3D (DirectX) interface to graphics hardware also provides linear, exponential and exponential squared for density equations.

As explained above, various fog mechanisms have been employed in the past in order to make a 3D graphics image appear more natural and realistic. However, while significant work has been done in the past, further improvements in connection with fog simulation are desirable.

The present invention solves this problem by providing improved techniques and arrangements that further enhance the use of fog in graphics systems. The instant invention provides improved fog functions that enable new, interesting and visually enjoyable effects to be achieved in a graphics system. Additionally, the instant invention provides the ability to provide a horizontal range adjustment for the fog, thereby increasing the fog density towards the edges of the screen in order to make the effect more realistic. The invention further provides a method of sampling fog or screen space z for a normal quad and z blit is quad, when only one fog value is defined per quad. An exemplary fog calculation unit is also provided for implementing fog in accordance with the instant invention.

In accordance with one aspect provided by the invention, a method and system for simulating fog in a graphics system is provided which includes, obtaining a pixel color for a pixel, and blending a fog color with the pixel color, wherein the percentage of fog color blended with the pixel color is determined based on one of the following two fog density functions:

$Fog = 2^{-8 \cdot (Ze-Z0)/Z1-Z0)}$ (Backwards Exponential)

$Fog = 2^{-8 \cdot (Ze-Z0)/Z1-Z0)^{**2}}$ (Backwards Exponential Squared)

wherein Ze is an eye-space z value of the pixel, Z0 is an eye-space z value at which fog begins, and Z1 is an eye-space z value at which fog density substantially reaches a maximum value.

A range adjustment is preferably made to the eye-space z value (Ze) prior to applying the fog density function in order to compensate for the change in range as the viewing angle increases in the x direction away from the Z axis.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

FIG. 6a shows a conventional linear fog curve;

FIGS. 6b–6e show exemplary exponential, exponential squared, reverse exponential and reverse exponential squared fog curves, respectively, in accordance with the instant invention;

FIG. 7 is a graph demonstrating the increasing fog error that results when no horizontal range adjustment is used;

FIG. 8 is an exemplary fog compensation function that can be used to correct the error shown in FIG. 7;

FIG. 9, is an exemplary embodiment of a fog calculation unit for calculating fog in accordance with the instant invention.

DETAILED DESCRIPTION OF EXAMPLE EMBODIMENTS OF THE INVENTION

Figure 1:
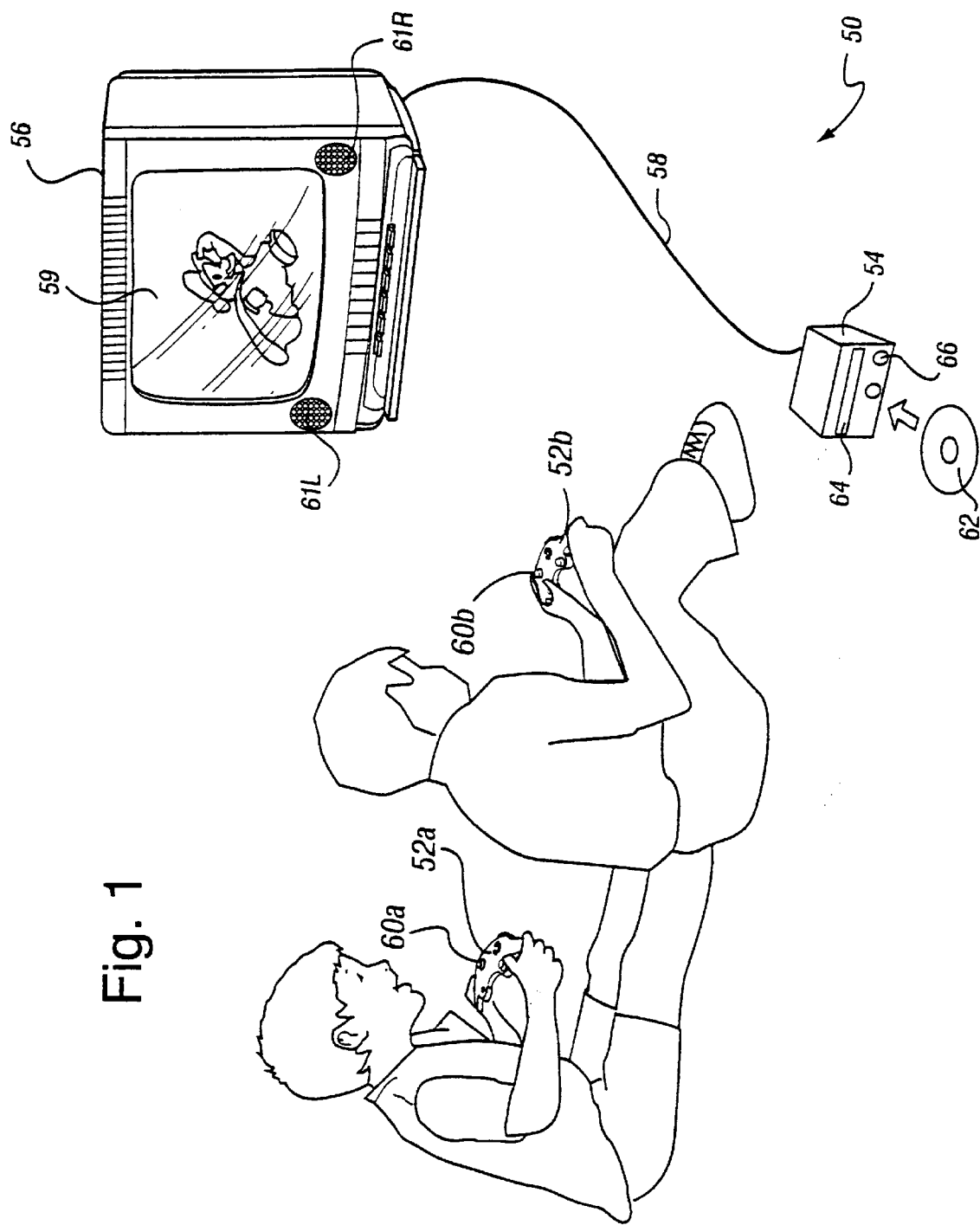
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what controls the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
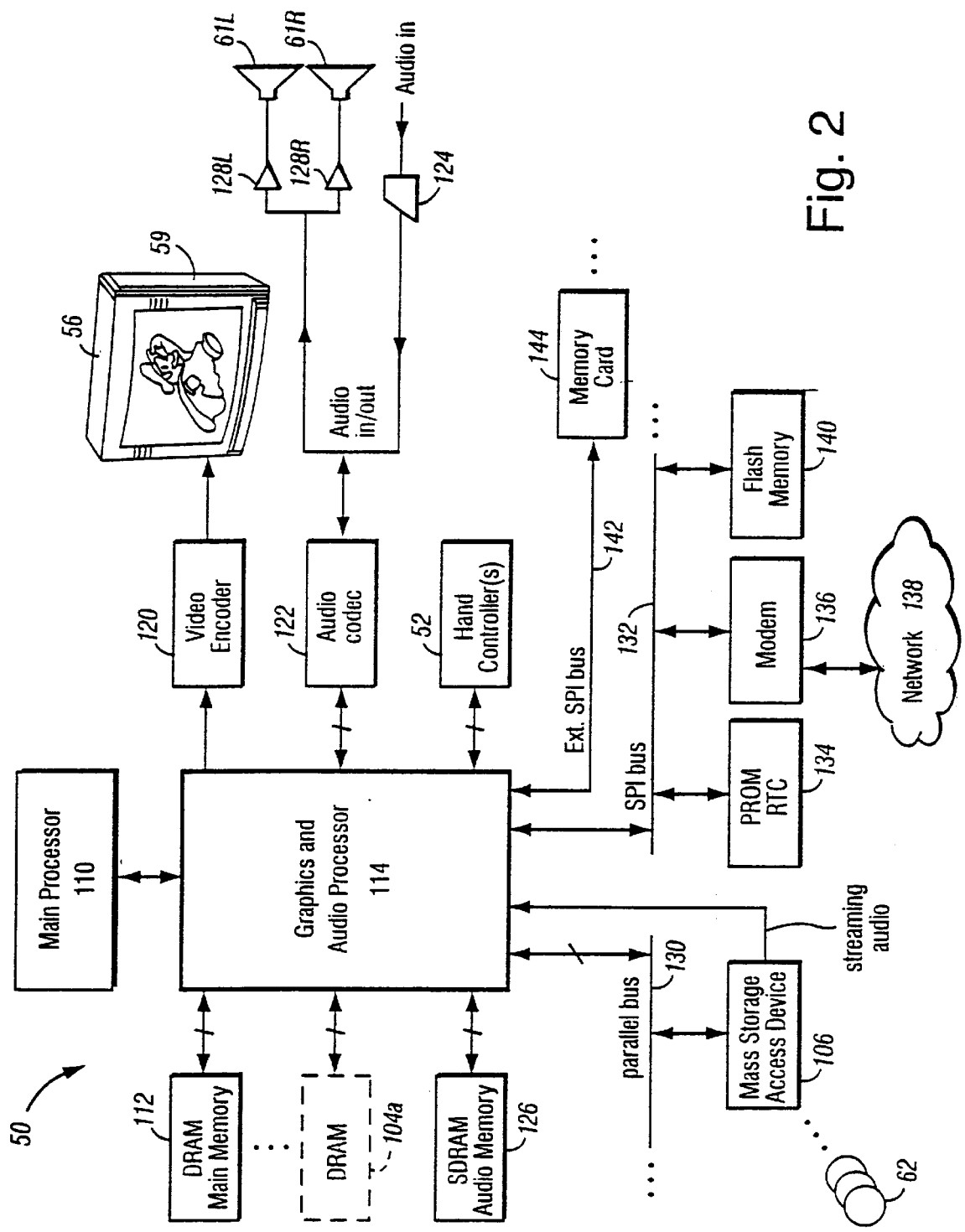
FIG. 2 is a block diagram of the FIG. 1 example computer graphics system.

FIG. 2 shows a block diagram of example components of system 50. The primary components include:

a main processor (CPU) 110, a main memory 112, and a graphics and audio processor 114.

In this example, main processor 110 (e.g., an enhanced IBM Power PC 750) receives inputs from handheld controllers 108 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 50 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 50. For example, a parallel digital bus 130 may be used to communicate with mass storage access device 106 and/or other components. A serial peripheral bus 132 may communicate with a variety of peripheral or other devices including, for example:

- a programmable read-only memory and/or real time clock 134,
- a modem 136 or other networking interface (which may in turn connect system 50 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
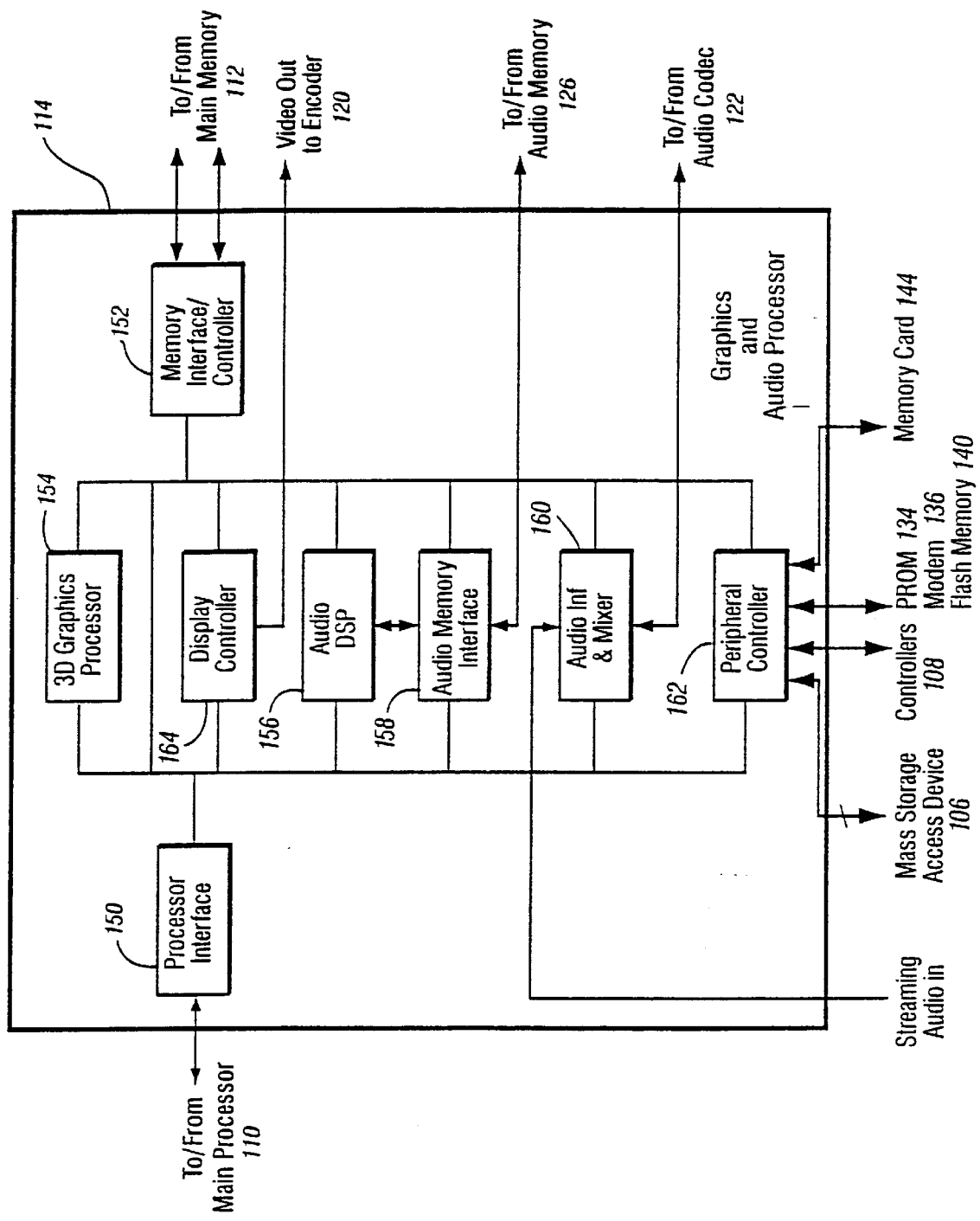
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

- a processor interface 150,
- a memory interface/controller 152,
- a 3D graphics processor 154,
- an audio digital signal processor (DSP) 156,
- an audio memory interface 158,
- an audio interface and mixer 160,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 160 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
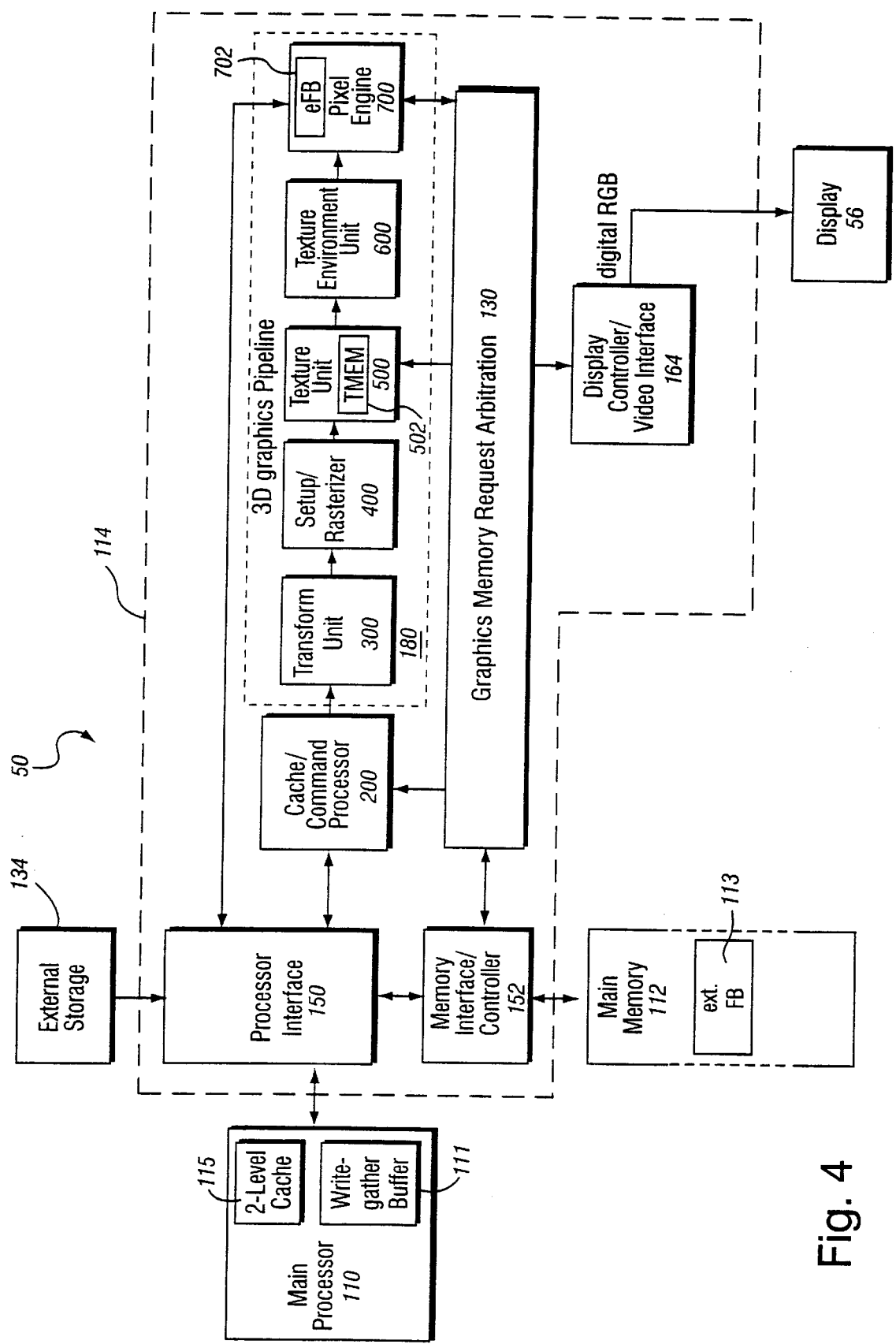
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164— which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200a that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:

retrieving textures 504 from main memory 112, texture processing (500a) including, for example, multi-texture handling, post-cache texture decompression, texture filtering, embossing, shadows and lighting through the use of projective textures, and BLIT with alpha transparency and depth, bump map processing for computing texture coordinate displacements for bump mapping, pseudo texture and texture tiling effects (500b), and indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to main memory 112 for access by display/video interface unit 164. This copy operation 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 102.

Fog Simultaion

When fog is enabled, a constant fog color is blended with the pixel color output from the last active Texture Environment (TEV) stage. The percentage of fog color blended depends on the fog density, which is a function of the distance from a viewpoint to a quad (2×2 pixels). In this example, the graphics processor 114 preferably supports five types of fog each of which provides a different fog density function.

The first fog type is the conventional linear fog as shown in FIG. 6a, wherein the fog equation provides a constant increase in fog density between a starting point where the linear fog begins and an ending point where the fog reaches its maximum value. For this conventional linear fog, the fog equation is:

$$Fog=(Ze-Z0)/(Z1-Z0)$$

where $Ze$ is the eye space z of the pixel, $Z0$ is the "fog start" value and is the eye-space z value at which linear fog begins or "kicks in", and $Z1$ is the "fog end" value and is the eye-space z value at which the fog density reaches its maximum value. FIG. 6a shows an example graph of the linear fog equation with "fog start"=50 and "fog end"=100.

The second and third types of fog are exponential fog and exponential squared fog. In contrast to the OpenGL and DirectX fog types, the instant invention incorporates a "fog start" value into the fog equations, thereby enhancing the functionality thereof. For exponential and exponential squared fog, the respective fog equations are:

$$Fog=1-2^{-8*(Ze-Z0)/(Z1-Z0)}$$

$$Fog=1-2^{-8*(Ze-Z0)/(Z1-Z0)**2}$$

where $Z1$ is the eye-space z value at which the fog density almost reaches 1. FIGS. 6b and 6c show example graphs of the exponential and exponential squared fog equations, respectively, with $Z0=50$ and $Z1=100$.

The fourth and fifth types of fog are entirely new and are not based on previous fog equations, such as those provided in OpenGL. These two new fog types are backwards exponential fog and backwards exponential squared fog. The respective fog equations for these two fog types are:

$$Fog=2^{-8*(Ze-Z0)/(Z1-Z0)}$$

$$Fog=2^{-8*(Ze-Z0)/(Z1-Z0)**2}$$

where $Z1$ is the eye-space z value at which the fog density almost reaches 1. FIGS. 6d and 6e show example graphs of these two fog equations, respectively, with $Z0=50$ and $Z1=100$. Unlike the exponential fog and exponential squared fog, the backwards exponential fog and backwards exponential squared fog have more gentle slopes at first and steep slopes near the end. These two entirely new fog types enable new and interesting fog effects to be achieved, thereby further improving use of fog in 3D graphics systems. For example, these two fog types can be used to provide an improved curtain-type fog effect, wherein an object suddenly passes therethrough, which provides an interesting visual effect superior to that of the other known fog types for certain applications. It is noted that a near (start) and far (end) z for the fog function can be programmed independently of the clipping near and far z.

The eye-space z used for fog calculations, in the manner described above, does not represent the correct range unless the viewer is facing the same direction as the Z axis. Specifically, as shown in FIG. 7, if only the eye-space z is used for determining the range, and increasing error will result as the line of sight moves away from the Z axis. As shown in FIG. 7, the range error, represented by shaded portions 610a and 610b, increases as the angle α increases away from the Z axis. However, in accordance with a preferred embodiment of the instant invention, a range adjustment factor based upon the x value is used to compensate for this inaccuracy. The range adjustment or fog compensation function effectively increases the fog density towards the edges of the screen in order to make the fog effect more accurate and realistic.

In accordance with the preferred embodiment, and as shown in FIG. 8, the fog compensation function is:

$$sqrt((x\text{-center})^2+k^2)/k$$

where the value "center" is programmable so as to support split screen multiplayer games. The center is preferably set to half the width of the screen plus the x offset of the window with respect to the coordinate system. The value k determines how fast the fog density increases as x changes. The adjustment is computed by linearly interpolating two samples of the function. The samples (r0–r9) of the range adjustment function are stored for use in the range adjustment calculation. It is noted that only half of the function needs to be stored due to the fact that the function is symmetrical at the center.

In this example, there is only one fog value for each quad. Thus, the position where fog or screen space z (Zs) is sampled is very important. The following rules can be used for a regular quad:

If only one pixel is covered, that pixel is selected.
If two pixels are covered, a pixel is selected in the following order: upper left, upper right, lower left, and lower right.
If three pixels are covered, the pixel that touches two neighboring pixels are selected.
within the selected pixel, the subsample position is selected in the following order: multisample 0 (MS0), MS1, MS2.
If all four pixels are covered, the center of the quad is used.

For a zblit quad, as opposed to a regular quad, the minimum of the four pixels' z after z blending is used as the sample location.

After the sampling position is determined, Zs is computed as z0+zx*dx+zy*dy in s2.24. The upper three bits are used for detecting overflow or underflow. Zs is then clamped to U0.24 as follows:

| | |
|---|---|
| 000 | No overflow/underflow |
| 01X | Overflow, Zs is clamped to 1.0 (0xFFFFFF) |
| 0X1 | Overflow, Zs is clamped to 1.0 (0xFFFFFF) |
| 1XX | Underflow, Zs is clamped to 0.0 (0x000000) |

When using a perspective projection, the fog types can be programmed into a couple of equations. The first equation computes eye-space z from the screen-space z:

$$Ze=f*n/(f-(f-n)*Zs)$$

$$Ze=[n,f] \text{ and } Zs=[0,1].$$

As a result, Ze=n when Zs=0, Ze=f when Zs=1 (the sense of Ze is reversed). The next step compensates Ze by multiplying Ze with a factor which is a function of the current quad x location.

$$Ze'=Ze*r(x)$$

The second equation normalizes Ze to Zn where Zn=0 when Ze=Z0 (fog start), Zn=1 when Ze=Z1.

$$Zn=(Ze'-Z0)/(Z1-Z0)$$

By combining the two equations, we get $$Zn=A*r(x)/(B-Zs)-C$$

Where:

$$A=f*n/((f-n)*(Z1-Z0))$$

$$B=f/(f-n)$$

$$C=Z0/(Z1-Z0)$$

In order to simplify hardware, Ze can be written as:

$$Ze=A/(B-Zs)=A/((B\_mant/2-(Zs>>B\_expn+1))*2^{(B-expn+1)})=(A/2^{(B-expn+1)})/(B\_mant/2-(Zs>>B\_expn+1))=a/(b-(zs>>b\_shf))$$

Then:

$$a=A/2^{(B-expn+1)}$$

$$b\_mag=B\_mant/2$$

$$b\_shf=B\_expn+1$$

On the other hand, for orthographic projection, the following equations apply:

$$Zn=a*r(x)*Zs-c$$

$$a=1(Z1-Z0)$$

$$c=Z0/(Z1-Z0)$$

Z0 and Z1 are specified in screen space rather than eye space.

After Zn is computed, as explained above, is can be used for computing fog density according to the fog type selected, i.e. linear, exponential, exponential squared, backwards exponential, or backwards exponential squared.

Example Implementation Details

FIG. 9 shows an exemplary Fog Calculation Unit 600b which can be used to calculate fog in accordance with the instant invention. As explained in connection with FIG. 5, the Fog Calculation Unit 600b receives input from the last active stage of the Texture Environment Unit (TEV) 600a. The Fog Calculation Unit then blends a constant fog color with the pixel color output from the last active TEV stage. The percentage of fog color blended depends on the fog density, which is a function of the distance from the viewpoint to a quad.

As shown in FIG. 9, upon receiving the appropriate input, the z_offset block 602 of the Fog Calculation Unit computes the value of the centroid of the current quad, which is determined by using the coverage of the pixels within the quad, as explained above. The screen-to-eye-space-z section 604 then converts the value from screen space z to eye space z, and multiplies (via multiplier 616) the result by a constant "a" related to the required fog density. As explained in greater detail below, the "b" parameter, introduced at subtracter 618, for the screen to eye space z conversion function is provided by the tev_fog_param_1 register. The "a" parameter of the screen to eye space conversion function is provided by the tev_fog_param_0 register. The dotted line in FIG. 9 shows the alternative method of doing this operation in the case of an orthographic projection, rather than a perspective projection.

The range_adj block 606 computes a range adjustment based on the x location of the current quad. The screen z is then multiplied by the range adjustment at multiplier 608. Parameter "c", provided by the tev_fog_param_3 register, is then introduced at subtracter 610 to specify the amount to subtract from eye-space Z after range adjustment. A clamping operation is then performed at block 612 to provide Zn.

After Zn is computed, it can be used for computing fog density according to the particular fog type selected. Specifically, by selecting the appropriate inputs to multiplexors 614a, 614b, 614c and 614b, thereby selectively applying sections 615a, 615b, 615c and 615d, the desired one of the five available fog types can be selected, i.e. linear, exponential, exponential squared, backwards exponential or backwards exponential squared. Thus, the appropriate fog density is used for determining the percentage of fog color blended with the pixel color output from the last active TEV stage. The calculated fog is then output from the last multiplexor 614d for further processing by the graphic system.

In the preferred embodiment, fog is controlled using the following function:
GXSetFog:

| Argument: | | |
|---|---|---|
| GXFogTYPES | Type; | //Type of Fog (none, linear, Exp, Exp2, Bexp, Bexp2) |
| GXBool | Proj; | //Enable screen to eye space conversion |
| GXBool | Range; | //Enable horizontal range adjustment |
| f32 | StartZ; | |
| f32 | EndZ; | //Start and End (or near-End) Z values |
| f32 | NearZ; | |
| f32 | FarZ; | //Near and Far Z values in the scene |
| f32 | SideX; | //X value of right side of view frustrum |
| GXColor | Color; | //Fog Color (RGBX8) |

This function computes the fog parameters required by the hardware and loads them into the Fog Calculation Unit. The NearZ and FarZ values should be consistent with the projection matrix parameters. The StartZ and EndZ values for fog should be in the same units as the NearZ and FarZ values. The parameters StartZ and EndZ control where the fog function starts and ends, respectively. Usually, the EndZ value is set to the far plane z. The NearZ and FarZ are needed to convert the rasterized screen Z value into an eye-space Z for fog computations. The Color parameter is the color of the pixel when fog density is 1.0.

The horizontal fog range adjustment is turned off by default in GXInit( ). In order to use this feature, the following functions may be called:

| | | |
|---|---|---|
| void GXInitFogAdjTable( | | |
| GXFogAdjTable* | Table, | |
| u16 | width, | |
| f32 | projmtx [4] [4] ); | |
| void GXSetFogRangeAdj ( | | |
| GXBool | enable, | |
| u16 | center, | |
| GXFogAdjTable* | table ); | |

The first function above is used to compute the adjustment table. The user must provide the allocated space for this table. The width parameter specifies the width of the viewport. The projmtx parameter is the projection matrix that will be used to render into the viewport. This parameter is needed for the function to compute the viewport's horizontal extent in eye space.

Once the table has been computed, it can be passed to the GXSetFogRangeAdj( )function. The enable parameter indicates whether horizontal fog range adjustment is enabled or not. The center parameter should be the X coordinate at the center of the viewport. As explained above, the range adjustment function is preferably symmetric about the center.

The following table shows exemplary register descriptions and formats:

| Register | Name | Format | Description |
|---|---|---|---|
| tev_range_adj_c | center | 10 | Specifies the screen's x center for range adjustment |
| | enb | 1 | Enable range adjustment. 0; TEV_ENB_DISABLE; Disable range adjustment. 1; TEV_ENB_ENABLE; Enable range adjustment. |
| tev_range_adj_k | r2k, r2k + 1 | u4.8 | Specifies the range adjustment function: $$adj = \frac{\sqrt{x^2 + k^2}}{k}$$ |
| tev_fog_param_0 | a | s11e8 | Specifies the "a" parameter of the screen to eye space conversion function: $$Z_e = \frac{a}{b - Z_s}$$ |
| tev_fog_param_1 | b_mag | u0.24 | Specifies the "b" parameter of the z screen to eye space conversion function: $$Z_e = \frac{a}{b\_mag - (zs \gg b\_shf)}$$ |
| tev_fog_param_2 | b_shf | 5 | Specifies the amount to pre-shift screen z. This is equivalent to the value of "b" parameter's exponent + 1. |
| tev_fog_param_3 | fsel | 3 | Specifies the fog type as follows: 0; TEV_FSEL_OFF; No fog 1; reserved 2; TEV_FSEL_LIN; Exponential Fog 3; reserved 4; TEV_FSEL_EXP; Exponential Fog 5; TEV_FSEL_EX2; Exponential Squared Fog 6; TEV_FSEL_BXP; Backward Exp Fog 7; TEV_FSEL_BX2 Backward Exp Squared Fog |
| | proj | 1 | Specifies whether we have a perspective or orthographic projection: 0; TEV_FOG_PERSP; Perspective projection 1; TEV_FOG_ORTHO; Orthographic projection |
| | c | s11e8 | Specifies the amount to subtract from eye-space Z after range adjustment. |
| tev_fog_color | r, g, b | 8 | Specifies the value of fog color. |

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 10A:
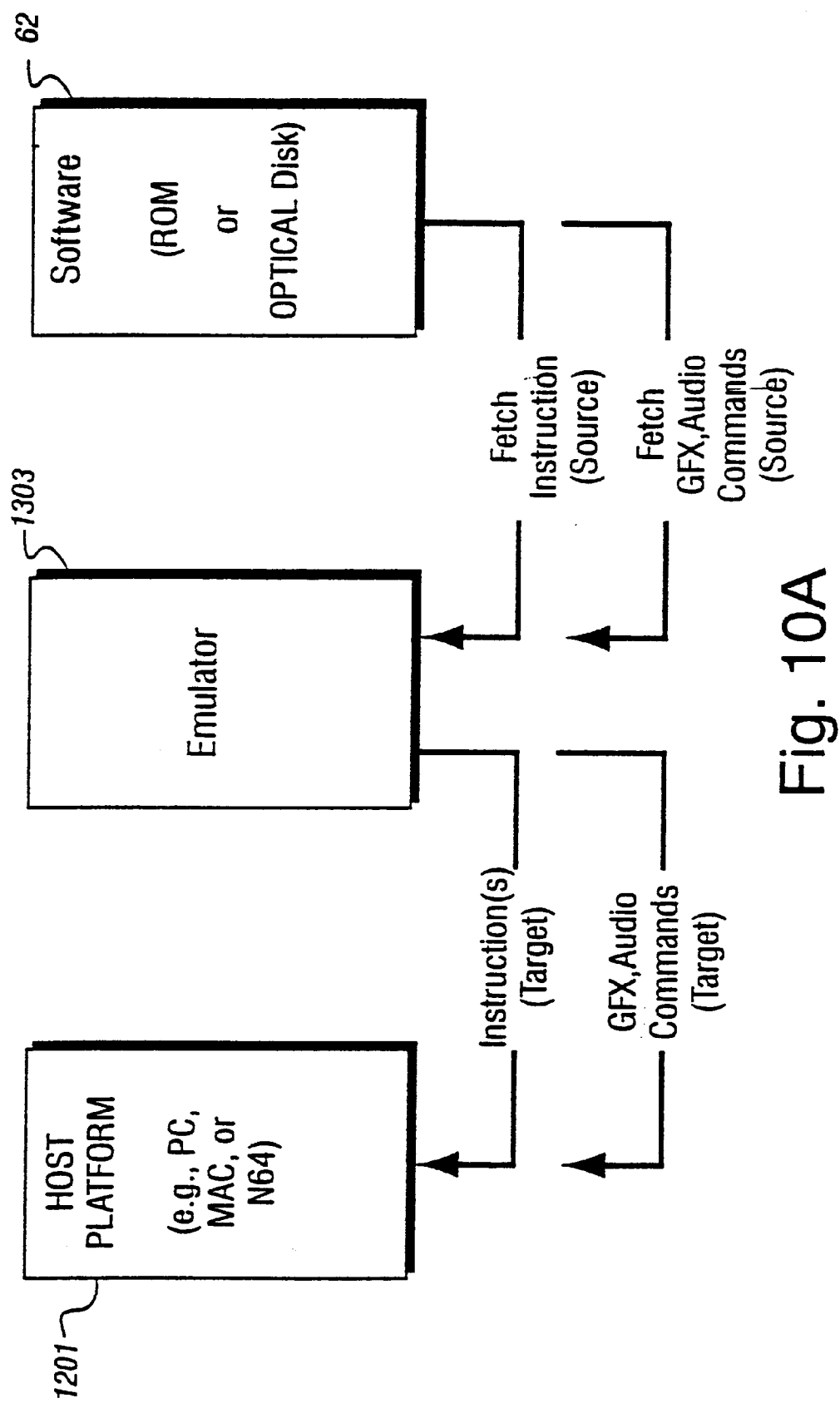
FIGS. 10A and 10B show example alternative compatible implementations.
Figure 10B:
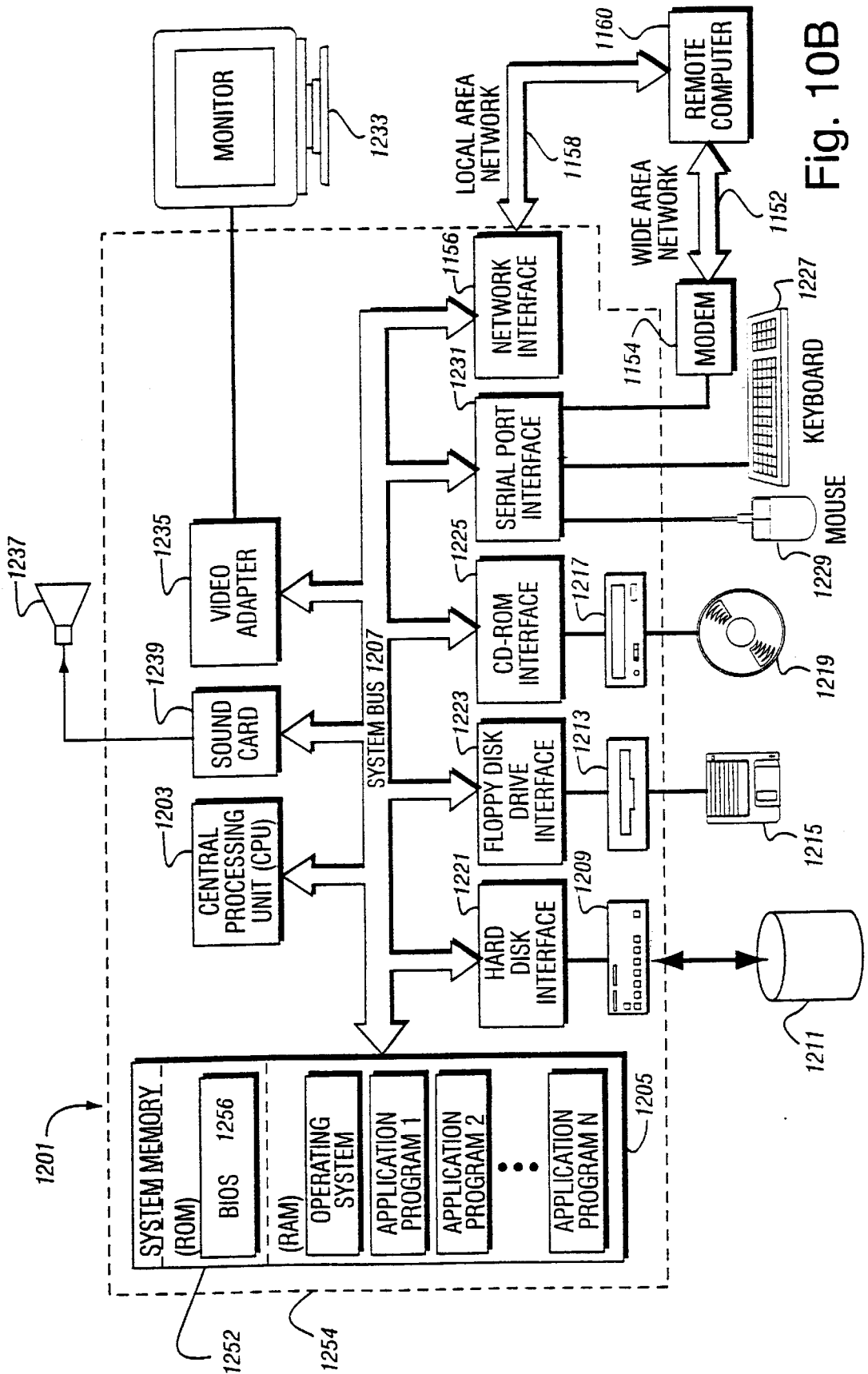

FIG. 10A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1303 fetches one or a sequence of binary-image program instructions from storage medium 62 and converts these program instructions to one or more equivalent Intel binary-image program instructions. The emulator 1303 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

FIG. 103B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 62.

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended. In the case where particular graphics support hardware within an emulator does not include fog functions shown in FIG. 9, the emulator designer has a choice of either:

- translating fog commands into other graphics API commands the graphics hardware does support; or
- implementing the fog functions in software with a potential corresponding decrease in performance depending upon the speed of the processor; or
- "stubbing" the fog commands to provide a rendered image that does not include fog effects.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the scope of the appended claims.

We claim:

1. A method for simulating fog in a graphics system, comprising:

obtaining a pixel color for a pixel; and blending a fog color with the pixel color;

wherein a percentage of fog color blended with the pixel color is determined based on the following fog density function:

$$Fog = 2^{-8*(Ze-Z0)/Z1-Z0)}$$

wherein Ze is an eye-space z value of the pixel, Z0 is an eye-space z value at which fog begins, and Z1 is an eye-space z value at which fog density substantially reaches a maximum value.

2. The method of claim 1, further including:

adjusting the eye-space z value (Ze) of the pixel based upon an X position (x) of the pixel prior to applying the fog density function.

3. The method of claim 2, further including:

using an adjusting function for the adjusting of Ze that is symmetrical about a center point.

4. The method of claim 3, wherein the adjusting function is:

$$sqrt((x\text{-center})^2 + k^2)/k$$

where center is an x location of the center of an image, and k determines how fast fog density increases away from the center.

5. A method for simulating fog in a graphics system, comprising:

obtaining a pixel color for a pixel; and blending a fog color with the pixel color;

wherein a percentage of fog color blended with the pixel color is determined based on the following fog density function:

$$Fog = 2^{-8*(Ze-Z0)/Z1-Z0)**2}$$

wherein Ze is an eye-space z value of the pixel, Z0 is an eye-space z value at which fog begins, and Z1 is an eye-space z value at which fog density substantially reaches a maximum value.

6. The method of claim 5, further including:

adjusting the eye-space z value (Ze) of the pixel based upon an X position (x) of the pixel prior to applying the fog density function.

7. The method of claim 6, further including:

using an adjusting function for the adjusting of Ze that is symmetrical about a center point.

8. The method of claim 7, wherein the adjusting function is:

$$sqrt((x\text{-center})^2 + k^2)/k$$

where center is an x location of the center of an image, and k determines how fast fog density increases away from the center.

9. A graphics system, comprising:

a first section which obtains a pixel color for a pixel; and a second section which blends a fog color with the pixel color;

wherein the second section determines a percentage of fog color blended with the pixel color based on the following fog density function:

$$Fog = 2^{-8*(Ze-Z0)/Z1-Z0)}$$

wherein Ze is an eye-space z value of the pixel, Z0 is an eye-space z value at which fog begins, and Z1 is an eye-space z value at which fog density substantially reaches a maximum value.

10. The graphics system of 9, further including:

a third section which adjusts the eye-space z value (Ze) of the pixel based upon an X position (x) of the pixel prior to applying the fog density function.

11. The graphics system of claim 10, wherein the third section applies an adjusting function for the adjusting of Ze that is symmetrical about a center point.

12. The graphics system of claim 11, wherein the adjusting function is:

$$sqrt((x\text{-center})^2 + k^2)/k$$

where center is an x location of the center of an image, and k determines how fast fog density increases away from the center.

13. A graphics system, comprising:

a first section which obtains a pixel color for a pixel; and a second section which blends a fog color with the pixel color;

wherein the second section determines a percentage of fog color blended with the pixel color based on the following fog density function:

$$Fog = 2^{-8*(Ze-Z0)/Z1-Z0)**2}$$

wherein Ze is an eye-space z value of the pixel, Z0 is an eye-space z value at which fog begins, and Z1 is an eye-space z value at which fog density substantially reaches a maximum value.

14. The graphics system of 13, further including:

a third section which adjusts the eye-space z value (Ze) of the pixel based upon an X position (x) of the pixel prior to applying the fog density function.

15. The graphics system of claim 14, wherein the third section applies an adjusting function for the adjusting of Ze that is symmetrical about a center point.

16. The graphics system of claim 15, wherein the adjusting function is:

$$sqrt((x\text{-center})^2 + k^2)/k$$

where center is an x location of the center of an image, and k determines how fast fog density increases away from the center.

17. In a graphics system having the ability to simulate fog based on a fog density function, the improvement comprising:

a fog calculation unit implementing the following fog density function:

$$Fog = 2^{-8*(Ze-Z0)/Z1-Z0)}$$

wherein Ze is an eye-space z value of the pixel, Z0 is an eye-space z value at which fog begins, and Z1 is an eye-space z value at which fog density substantially reaches a maximum value.

18. In a graphics system having the ability to simulate fog based on a fog density function, the improvement comprising:

a fog calculation unit implementing the following fog density function:

$$Fog = 2^{-8*(Ze-Z0)/Z1-Z0)**2}$$

wherein Ze is an eye-space z value of the pixel, Z0 is an eye-space z value at which fog begins, and Z1 is an eye-space z value at which fog density substantially reaches a maximum value.

19. A method for simulating fog in a graphics system, comprising:

obtaining a color for a location in an image to be rendered by the graphics system; and blending a fog color with the color;

wherein a percentage of fog color blended with the color is determined based on the following fog density function:

$$Fog = 2^{-8*(Ze-Z0)/Z1-Z0)}$$

wherein Ze is an eye-space z value of the location, Z0 is an eye-space z value at which fog begins, and Z1 is an eye-space z value at which fog density substantially reaches a maximum value.

20. A method for simulating fog in a graphics system, comprising:

obtaining a color for a location in an image to be rendered by the graphics system; and blending a fog color with the color;

wherein a percentage of fog color blended with the color is determined based on the following fog density function:

$$Fog = 2^{-8*(Ze-Z0)/Z1-Z0)**2}$$

wherein Ze is an eye-space z value of the location, Z0 is an eye-space z value at which fog begins, and Z1 is an eye-space z value at which fog density substantially reaches a maximum value.

* * * * *